(12) United States Patent
Bando

(10) Patent No.: US 12,484,324 B2
(45) Date of Patent: Nov. 25, 2025

(54) SOLID-STATE IMAGING ELEMENT, IMAGING DEVICE, AND METHOD OF CONTROLLING SOLID-STATE IMAGING ELEMENT

(71) Applicant: SONY SEMICONDUCTOR SOLUTIONS CORPORATION, Kanagawa (JP)

(72) Inventor: Masashi Bando, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 227 days.

(21) Appl. No.: 18/255,132

(22) PCT Filed: Nov. 25, 2021

(86) PCT No.: PCT/JP2021/043202
§ 371 (c)(1),
(2) Date: May 31, 2023

(87) PCT Pub. No.: WO2022/124092
PCT Pub. Date: Jun. 16, 2022

(65) Prior Publication Data
US 2024/0030245 A1    Jan. 25, 2024

(30) Foreign Application Priority Data
Dec. 8, 2020   (JP) .................. 2020-203115

(51) Int. Cl.
*H10F 39/00*       (2025.01)
*H04N 25/59*       (2023.01)
(Continued)

(52) U.S. Cl.
CPC ......... *H10F 39/8037* (2025.01); *H04N 25/59* (2023.01); *H04N 25/621* (2023.01);
(Continued)

(58) Field of Classification Search
CPC ...... H04N 25/59; H04N 25/621; H04N 25/63; H04N 25/709; H04N 25/77; H04N 25/771;
(Continued)

(56) References Cited

U.S. PATENT DOCUMENTS 9,780,138 B2 * 10/2017 Dupont ............... H10F 39/8037
2015/0028189 A1   1/2015 Hagiwara
(Continued)

FOREIGN PATENT DOCUMENTS

JP    2005-304009 A    10/2005
JP    2006-086425 A    3/2006
(Continued)

OTHER PUBLICATIONS

International Search Report and Written Opinion of PCT Application No. PCT/JP2021/043202, issued on Feb. 15, 2022, 09 pages of ISRWO.

*Primary Examiner* — Lin Ye
*Assistant Examiner* — Chriss S Yoder, III
(74) *Attorney, Agent, or Firm* — CHIP LAW GROUP

(57) ABSTRACT

Provided is a solid-state imaging element that includes a first photoelectric conversion unit having a light incident surface on which light is incident, a first gate electrode provided in the first photoelectric conversion unit via an insulating film, and a second photoelectric conversion unit provided on a side of the light incident surface with respect to the first photoelectric conversion unit. The solid-state imaging element further includes a voltage application unit that applies a voltage corresponding to the number of charges accumulated by the second photoelectric conversion unit to the first gate electrode.

12 Claims, 16 Drawing Sheets

(51) Int. Cl.
  *H04N 25/621* (2023.01)
  *H04N 25/63* (2023.01)
  *H04N 25/709* (2023.01)
  *H04N 25/77* (2023.01)
  *H04N 25/771* (2023.01)
  *H10F 39/12* (2025.01)
  *H10F 39/18* (2025.01)

(52) U.S. Cl.
  CPC ........... *H04N 25/63* (2023.01); *H04N 25/709* (2023.01); *H04N 25/77* (2023.01); *H04N 25/771* (2023.01); *H10F 39/18* (2025.01); *H10F 39/191* (2025.01); *H10F 39/812* (2025.01)

(58) Field of Classification Search
  CPC .... H10F 39/18; H10F 39/191; H10F 39/8037; H10F 39/807; H10F 39/812; H01L 27/14612; H01L 27/1463; H01L 27/14638; H01L 27/14643; H01L 27/14665

See application file for complete search history.

(56) References Cited

U.S. PATENT DOCUMENTS

| | | | |
|---|---|---|---|
| 2015/0200229 A1* | 7/2015 | Rotte | H04N 25/626 250/208.1 |
| 2018/0350863 A1* | 12/2018 | Yamaguchi | H04N 25/76 |
| 2020/0260026 A1 | 8/2020 | Ono | |

FOREIGN PATENT DOCUMENTS

| | | | |
|---|---|---|---|
| JP | 2011-199816 A | 10/2011 | |
| JP | 2015-023250 A | 2/2015 | |
| WO | 2019/058994 A1 | 3/2019 | |
| WO | 2020/059553 A1 | 3/2020 | |

* cited by examiner

SOLID-STATE IMAGING ELEMENT, IMAGING DEVICE, AND METHOD OF CONTROLLING SOLID-STATE IMAGING ELEMENT

CROSS REFERENCE TO RELATED APPLICATIONS

This application is a U.S. National Phase of International Patent Application No. PCT/JP2021/043202 filed on Nov. 25, 2021, which claims priority benefit of Japanese Patent Application No. JP 2020-203115 filed in the Japan Patent Office on Dec. 8, 2020. Each of the above-referenced applications is hereby incorporated herein by reference in its entirety.

FIELD

The present disclosure relates to a solid-state imaging element, an imaging device, and a method of controlling a solid-state imaging element.

BACKGROUND

As a solid-state imaging element, for example, a back-illuminated complementary metal oxide semiconductor (CMOS) image sensor is known. Among the CMOS image sensors, a charge retention type CMOS image sensor (charge retention type global shutter CMOS image sensor) having a global shutter function has also been developed. The charge retention type global shutter CMOS image sensor includes a memory (MEM) that temporarily retains electric charges generated by a photodiode (PD) (See, for example, Patent Literature 1.).

In various CMOS image sensors, a gate electrode may be provided on a PD via an insulating film. Furthermore, in the charge retention type global shutter CMOS image sensor, a gate electrode is provided in the MEM via an insulating film. This is to facilitate charge transfer by temporarily increasing a potential of the MEM by application of a gate voltage when the charges accumulated in the PD are transferred to the MEM.

CITATION LIST

Patent Literature

Patent Literature 1: JP 2011-199816 A

SUMMARY

Technical Problem

A saturation signal amount (saturation charge amount) of the global shutter CMOS image sensor is defined by a smaller saturation signal amount of the PD or the MEM. Since the PD and the MEM are divided and formed in planar pixels, an effective area of the PD is reduced as compared with a CMOS image sensor including only the PD, and thus, there is a disadvantage that the saturation signal amount is inferior, and a dynamic range is reduced. Therefore, in the global shutter CMOS image sensor, expansion of the dynamic range is desired. Furthermore, even in the CMOS image sensor including only the PD, expansion of the dynamic range is desired.

Therefore, the present disclosure provides a solid-state imaging element, an imaging device, and a method of controlling a solid-state imaging element capable of expanding a dynamic range.

Solution to Problem

A solid-state imaging element according to an aspect of the present disclosure includes: a first photoelectric conversion unit having a light incident surface on which light is incident; a first gate electrode provided in the first photoelectric conversion unit via an insulating film; a second photoelectric conversion unit provided on a side of the light incident surface with respect to the first photoelectric conversion unit; and a voltage application unit that applies a voltage corresponding to the number of charges accumulated by the second photoelectric conversion unit to the first gate electrode.

DESCRIPTION OF EMBODIMENTS

Hereinafter, embodiments of the present disclosure will be described in detail with reference to the drawings. Note that a solid-state imaging element, an imaging device, and a method of controlling the solid-state imaging element according to the present disclosure are not limited by these embodiments. Furthermore, in each of the following embodiments, basically the same parts are denoted by the same reference signs, and redundant description is omitted.

One or a plurality of embodiments (including examples and modification examples) described below can each be implemented independently. On the other hand, at least some of the plurality of embodiments described below may be implemented by being appropriately combined with at least some of other embodiments. The plurality of embodiments may include novel features different from each other. Therefore, the plurality of embodiments can contribute to solving different objects or problems, and can exhibit different effects. Note that the effects in each embodiment are merely examples and are not limited, and other effects may be provided.

The present disclosure will be described according to the following order of items shown below.

Figure 1:
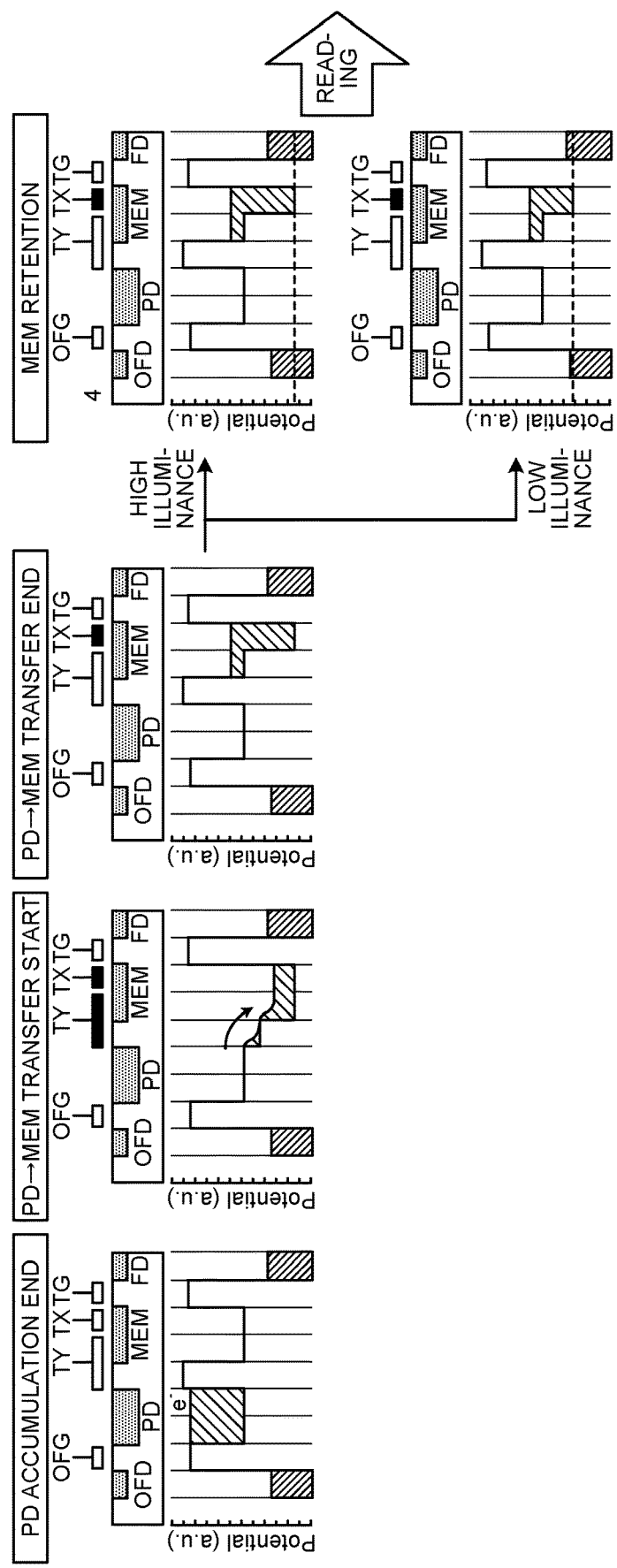
FIG. 1 is a diagram illustrating an example of an operation of a charge retention type global shutter CMOS image sensor according to each embodiment of the present disclosure.

1. Outline of charge retention type global shutter CMOS image sensor
2. First Embodiment
2-1. Schematic configuration example of solid-state imaging element
2-2. Schematic configuration example of pixel array unit
2-3. Schematic configuration example of second photoelectric conversion unit
2-4. Schematic configuration example of pixel circuit
2-5. Operation example of pixel circuit
2.6. Working and effect
3. Second Embodiment
4. Third Embodiment
5. Fourth Embodiment
6. Other embodiments
7. Application example
8. Application example
9. Supplementary note 1. Outline of Charge Retention Type Global Shutter CMOS Image Sensor First, an outline of a charge retention type global shutter CMOS image sensor according to each embodiment of the present disclosure will be described with reference to FIG. 1. FIG. 1 is a diagram illustrating an example of an operation of the charge retention type global shutter CMOS image sensor according to each embodiment of the present disclosure.

Normally, in a rolling shutter type CMOS image sensor, focal plane distortion occurs at the time of imaging a dynamic subject from an exposure time difference of each row. As one of means for solving this problem, there is a charge retention type global shutter CMOS image sensor. In this charge retention type global shutter CMOS image sensor, a memory (MEM) that temporarily retains electric charges via a transfer gate is formed adjacent to a photodiode (PD), and the electric charges accumulated in the PD by simultaneous exposure of all pixels are transferred to the MEM at the same time and retained for a certain period of time, and then read out in order in each row. For this reason, the simultaneity of the exposure time is maintained, and the focal plane distortion does not occur.

However, a saturation signal amount (saturation charge amount) of the charge retention type global shutter CMOS image sensor is defined by a smaller saturation signal amount of the PD or the MEM. Since the PD and the MEM are divided and formed in planar pixels, there is a disadvantage that an effective area of the PD is reduced and the saturation signal amount is inferior as compared with an image sensor having only the PD. Note that the PD is an example of a photoelectric conversion unit, and the memory is an example of a charge storage unit.

Here, as illustrated in FIG. 1, the MEM of the charge retention type global shutter CMOS image sensor is provided with several gates (gate electrodes) via an insulating film (not illustrated in FIG. 1). This is to facilitate charge transfer by temporarily increasing a potential of the MEM by applying a gate voltage (for example, drive signals TY, TX, TG) to each gate when the charges accumulated in the PD are transferred to the MEM. Note that when the gate is turned on, potential energy of Si becomes deep, and a gate capacitance also contributes to charge accumulation in the MEM. In a normal operation, the gate is in an OFF state during charge retention of the MEM, but if the gate is in an ON state and the MEM retains charges, the saturation signal amount of the MEM can be increased. That is, since the saturation signal amount of the MEM per unit area increases, the saturation signal amount of both the PD and the MEM can be expanded depending on the balance of the areas of the PD and the MEM in the plane.

However, in a case where the gate continues to retain the charges in the ON state, a dark current increases due to electrons generated at the gate insulating film/Si interface as compared with a case where the gate retains the charges in the OFF state. Since a light signal is large at high illuminance, the dark current is inconspicuous, but this dark current increase cannot be ignored at low illuminance, and even if the amount of saturation signal increases, as a result, the dynamic range may be impaired.

Therefore, in a case of an image sensor having a mechanism for changing (for example, modulate the drive signal TX) a gate voltage during MEM retaining according to incident illuminance, it is possible to increase the saturation signal amount (signal) while suppressing the dark current (noise). As a result, the dynamic range of the global shutter can be expanded.

For example, as illustrated in FIG. 1, at high illuminance, the gate ON voltage by the drive signal TX is increased, and the saturation signal amount is increased. At this time, although the dark current increases, the dark current can be ignored because the dark current is smaller than the light signal amount. On the other hand, at low illuminance, the gate ON voltage by the drive signal TX can be lowered to suppress the dark current. This makes it possible to increase the saturation signal amount while suppressing the generation of the dark current. The following embodiments will be described in detail.

2. First Embodiment

<2-1. Schematic Configuration Example of Solid-State Imaging Element>

Figure 2:
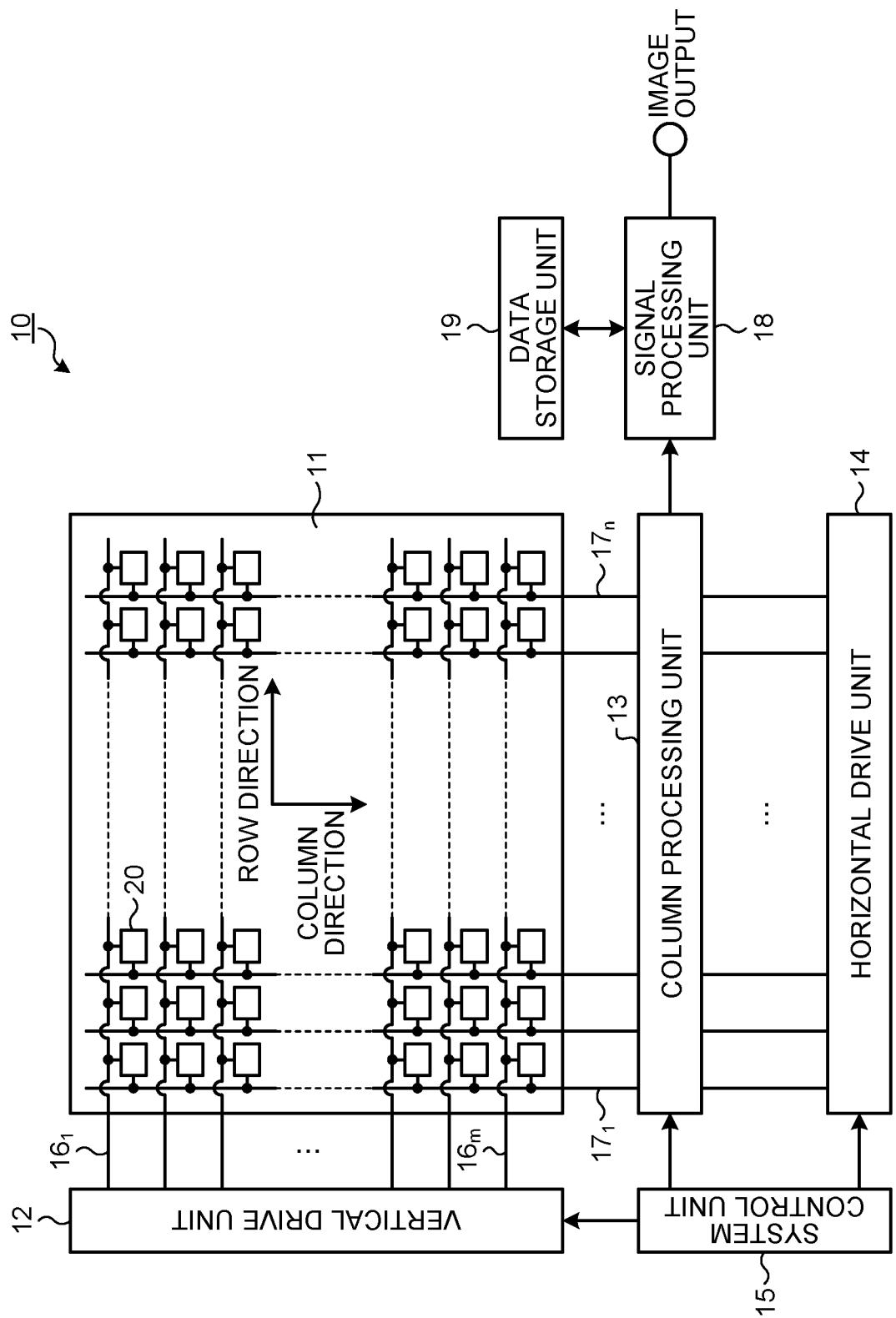
FIG. 2 is a diagram illustrating an example of a schematic configuration of a solid-state imaging element according to a first embodiment.

A schematic configuration example of a solid-state imaging element 10 according to a first embodiment will be described with reference to FIG. 2. FIG. 2 is a block diagram illustrating an example of a schematic configuration of the solid-state imaging element 10 according to the first embodiment.

As illustrated in FIG. 2, the solid-state imaging element 10 includes a pixel array unit 11, a vertical drive unit 12, a column processing unit 13, a horizontal drive unit 14, and a system control unit 15. The pixel array unit 11, the vertical drive unit 12, the column processing unit 13, the horizontal drive unit 14, and the system control unit 15 are formed on a semiconductor substrate (chip) not illustrated in FIG. 1. The solid-state imaging element 10 is, for example, a CMOS image sensor.

The pixel array unit 11 includes a plurality of pixels (unit pixels) 20. Each of the pixels 20 generates a photocharge (charge) of a charge amount corresponding to an amount of incident light and accumulates the photocharge inside, and is two-dimensionally arranged in a matrix array. These pixels 20 have, for example, a back-illuminated pixel structure.

Furthermore, the pixel array unit 11 includes pixel drive lines 16 ($16_1$ to $16_m$) and vertical signal lines 17 ($17_1$ to $17_n$). The pixel drive lines 16 ($16_1$ to $16_m$) are formed along a left-right direction in FIG. 1 for each row with respect to a pixel array of m rows×n columns (m and n are each an integer of 1 or more). The vertical signal lines 17 ($17_1$ to $17_n$) are formed along a vertical direction in FIG. 1 for each column with respect to the pixel array of m rows×n columns. Note that the vertical signal lines 17 are also referred to as VSLs. One end of each of the pixel drive lines 16 is connected to an output terminal corresponding to each row of the vertical drive unit 12.

The vertical drive unit 12 includes, for example, a shift register, an address decoder, and the like. The vertical drive unit 12 is a pixel drive unit that drives each of the pixels 20 of the pixel array unit 11 at the same time for all pixels or in units of rows. The pixel signal output from each of the pixels 20 selectively scanned by the vertical drive unit 12 is supplied to the column processing unit 13 through each of the vertical signal lines 17. The vertical drive unit 12 includes a read scanning system and a sweep scanning system, and can perform batch sweep and batch transfer under driving by these scanning systems.

For example, the read scanning system sequentially selects and scans the pixels 20 of the pixel array unit 11 row by row in order to read signals from the pixels 20. In a case of row driving (rolling shutter operation), the sweep scanning system performs sweep scanning on a read row on which read scanning is performed by the read scanning system prior to the read scanning by a time corresponding to a shutter speed. Furthermore, in a case of global exposure (global shutter operation), the sweep scanning system performs collective sweeping earlier than collective transfer by the time corresponding to the shutter speed. Note that, in the first to third embodiments, the global shutter operation is used, and in the fourth embodiment, the rolling shutter operation is used.

By such sweeping, unnecessary charges are swept (reset) from the pixels 20 of the read row. Then, a so-called electronic shutter operation is performed by sweeping (resetting) unnecessary charges. Here, the electronic shutter operation refers to an operation of discarding the photocharges of the pixels 20 and newly starting exposure (starting accumulation of photocharges). Furthermore, a signal read by the read operation by the read scanning system corresponds to an amount of light incident after the immediately preceding read operation or the electronic shutter operation. In the case of the rolling shutter operation, a period from the read timing by the immediately preceding read operation or the sweep timing by the electronic shutter operation to the read timing by the current read operation is a photocharge accumulation period (exposure period) in the unit pixel. In the case of the global shutter operation, a period from the batch sweep to the batch transfer is the accumulation period (exposure period).

The column processing unit 13 performs predetermined signal processing on the pixel signal output from each of the pixels 20 of the selected row through the vertical signal lines 17 for each pixel column of the pixel array unit 11, and temporarily holds the pixel signal after the signal processing. Specifically, the column processing unit 13 performs at least noise removal processing, for example, correlated double sampling (CDS) processing as signal processing. By the correlated double sampling by the column processing unit 13, fixed pattern noise unique to pixels such as reset noise and threshold variation of an amplification transistor is removed. Note that the column processing unit 13 can be provided with, for example, an analog-digital (AD) conversion function in addition to the noise removal processing, and a signal level can be output as a digital signal.

The horizontal drive unit 14 includes, for example, a shift register, an address decoder, and the like. The horizontal drive unit 14 sequentially selects unit circuits corresponding to the pixel columns of the column processing unit 13. By the selective scanning by the horizontal drive unit 14, the pixel signals subjected to the signal processing by the column processing unit 13 are sequentially output to a signal processing unit 18.

The system control unit 15 includes, for example, a timing generator that generates various timing signals. The system control unit 15 performs drive control of the vertical drive unit 12, the column processing unit 13, the horizontal drive unit 14, and the like on the basis of various timing signals generated by the timing generator.

Note that the solid-state imaging element 10 includes the signal processing unit 18 and a data storage unit 19. The signal processing unit 18 has at least an addition processing function, and performs various signal processing such as addition processing on the pixel signal output from the column processing unit 13. The data storage unit 19 temporarily stores data necessary for the signal processing in the signal processing unit 18. The signal processing unit 18 and the data storage unit 19 may be realized by an external signal processing unit provided on a substrate different from the solid-state imaging element 10, for example, a digital signal processor (DSP) or processing by software, or may be mounted on the same substrate as the solid-state imaging element 10.

<2-2. Schematic Configuration Example of Pixel Array Unit>

Figure 3:
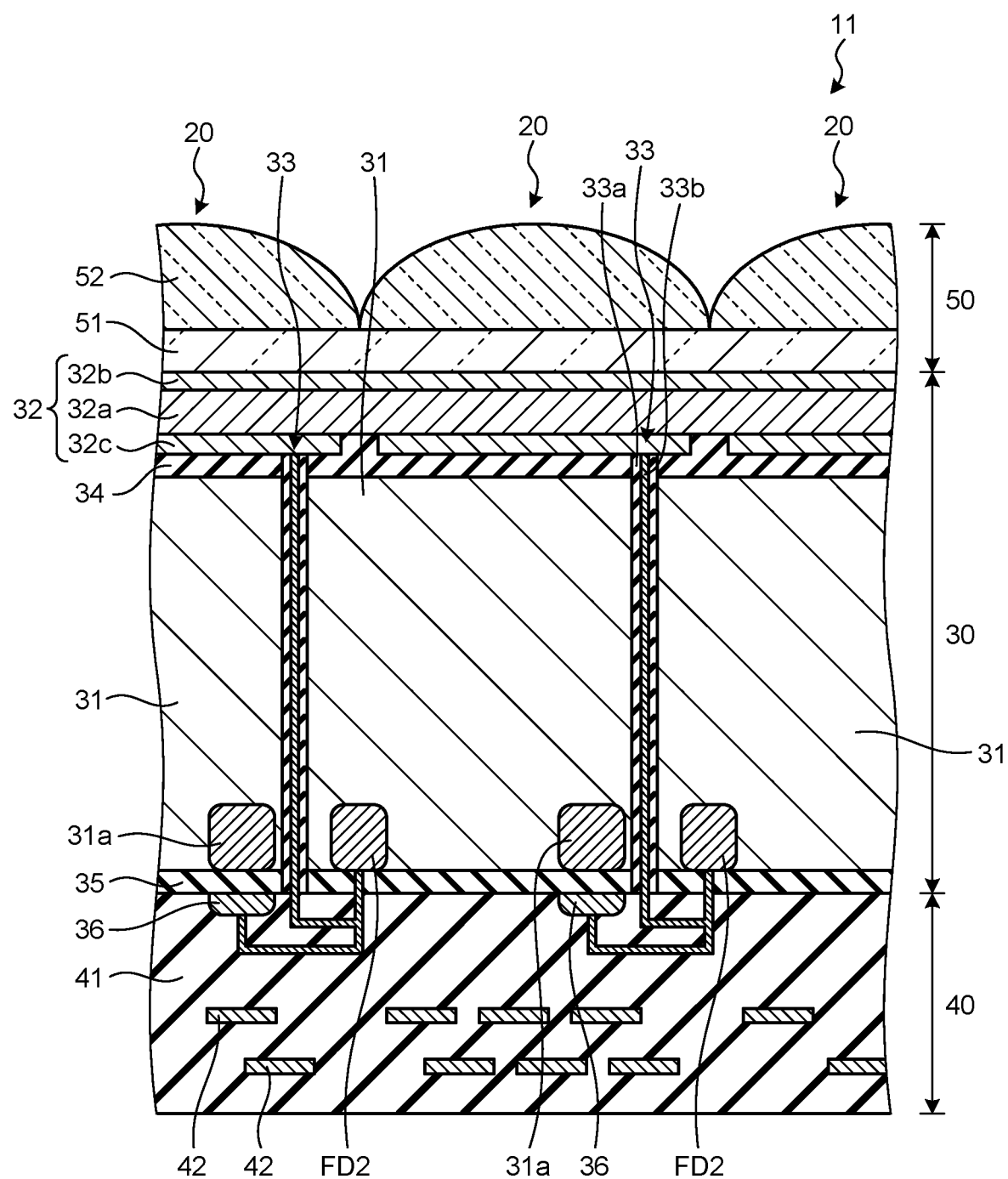
FIG. 3 is a cross-sectional view illustrating an example of a schematic configuration of a pixel array unit according to the first embodiment.

A schematic configuration example of the pixel array unit 11 according to the first embodiment will be described with reference to FIG. 3. FIG. 3 is a cross-sectional view illustrating an example of a schematic configuration of the pixel array unit 11 according to the first embodiment.

As illustrated in FIG. 3, the pixel array unit 11 includes a semiconductor layer 30, a wiring layer 40, and an optical layer 50. The optical layer 50, the semiconductor layer 30, and the wiring layer 40 are laminated in this order from a side of a light incident surface where light from the outside enters the pixel array unit 11.

The semiconductor layer 30 includes first photoelectric conversion units 31 for each of the pixels 20, a second photoelectric conversion unit 32 common to each of the pixels 20, an element isolation portion 33 that partitions each of the first photoelectric conversion units 31, an upper insulating film 34 common to each of the pixels 20, and a lower insulating film 35 common to each of the pixels 20. The semiconductor layer 30 corresponds to a semiconductor substrate.

Each of the first photoelectric conversion units 31 performs photoelectric conversion to generate a charge corresponding to an amount of received light. As the first photoelectric conversion unit 31, for example, a photodiode with a PN junction is used. The semiconductor layer 30 has a semiconductor region of a first conductivity type (for example, P-type) and a semiconductor region of a second conductivity type (for example, N-type). By forming the semiconductor region of the second conductivity type in the semiconductor region of the first conductivity type for each pixel, the first photoelectric conversion unit 31 is formed for each of the pixels 20.

Each of such first photoelectric conversion units 31 is sandwiched between the upper insulating film 34 and the lower insulating film 35. Each of the first photoelectric conversion units 31 includes a charge storage unit (charge retaining unit) 31a and a floating diffusion (floating diffusion layer) FD2. The charge storage unit 31a corresponds to a memory (MEM). The charge storage unit 31a temporarily retains the charge generated by the first photoelectric conversion unit 31. A gate electrode 36 is provided at a position facing the charge storage unit 31a of the first photoelectric conversion unit 31 via the lower insulating film 35. The floating diffusion FD2 converts a charge into a voltage. The floating diffusion FD2 is provided at a position facing the charge storage unit 31a via the element isolation portion 33, that is, at the adjacent first photoelectric conversion unit 31.

The second photoelectric conversion unit 32 performs photoelectric conversion to generate a charge corresponding to an amount of received light. The second photoelectric conversion unit 32 is formed on a side of the light incident surface (upper side in FIG. 3) of the semiconductor layer 30. The second photoelectric conversion unit 32 includes, for example, a photoelectric conversion film 32a, an upper electrode 32b, and a lower electrode 32c. The photoelectric conversion film 32a is sandwiched between the upper electrode 32b and the lower electrode 32c. The lower electrode 32c is configured by, for example, providing an electrode for each of the pixels 20.

The element isolation portion 33 isolates the individual first photoelectric conversion units 31 of the pixels 20 adjacent to each other. For example, the element isolation portion 33 is formed such that a shape viewed from the light incident surface is a lattice shape. The element isolation portion 33 includes an insulating film 33a and a wiring 33b. The insulating film 33a covers an inner peripheral surface of a trench provided by digging the semiconductor layer 30. The wiring 33b is a metal layer that fills the inside of the trench covered with the insulating film 33a. The wiring 33b electrically connects the lower electrode 32c of the second photoelectric conversion unit 32 to the gate electrode 36 and the floating diffusion FD2.

The wiring layer 40 is provided on a surface (lower surface in FIG. 3) of the semiconductor layer 30 opposite to the side of the light incident surface. The wiring layer 40 includes an insulating layer 41 and a plurality of wirings 42. For example, each of the wirings 42 is formed in a layer shape in the insulating layer 41. Note that a transistor, a read circuit (none of which are illustrated in FIG. 3), and the like are also formed in the wiring layer 40.

The optical layer 50 is provided on a light incident surface (upper surface in FIG. 3) of the semiconductor layer 30. The optical layer 50 includes a color filter 51 and an on-chip lens 52. Note that the optical layer 50 may have another layer such as a planarization film.

The color filter 51 is an optical filter that transmits light of a predetermined wavelength among light condensed by the on-chip lens 52. The color filter 51 is laminated on the light incident surface of the semiconductor layer 30. For example, the color filter 51 includes a color filter that transmits red light, a color filter that transmits green light, and a color filter that transmits blue light.

The on-chip lens 52 is a lens that condenses incident light on the first photoelectric conversion unit 31 of each of the pixels 20. The on-chip lens 52 is laminated on a light incident surface of the color filter 51. For example, the on-chip lens 52 is configured by providing a lens for each of the pixels 20. As a material of the on-chip lens 52, for example, a resin such as acrylic is used.

<2-3. Schematic Configuration Example of Second Photoelectric Conversion Unit>

Figure 4:
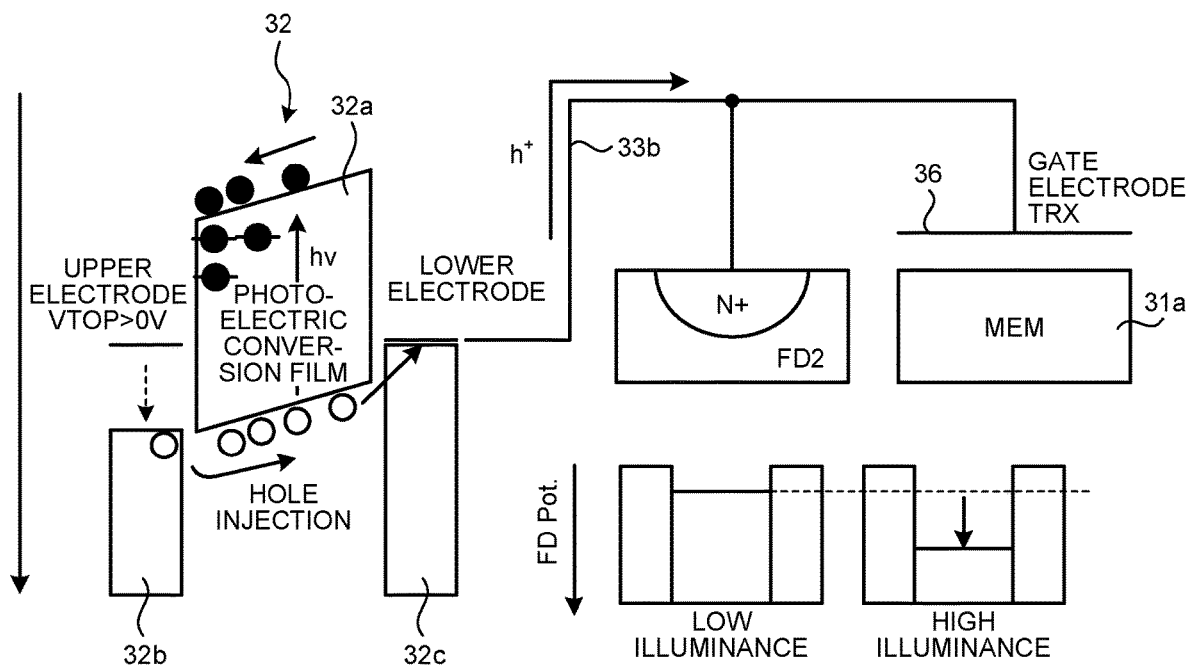
FIG. 4 is a diagram illustrating an example of a schematic configuration of a second photoelectric conversion unit according to the first embodiment.

A schematic configuration example of the second photoelectric conversion unit 32 according to the first embodiment will be described with reference to FIG. 4. FIG. 4 is a diagram illustrating an example of a schematic configuration of the second photoelectric conversion unit 32 according to the first embodiment.

As illustrated in FIG. 4, the second photoelectric conversion unit 32 has a structure in which the photoelectric conversion film 32a is laminated so as to be sandwiched between the upper electrode 32b and the lower electrode 32c which are a pair of transparent electrodes facing each other. The lower electrode 32c is electrically connected to the floating diffusion FD2 and the gate electrode 36 of the charge storage unit 31a by the wiring 33b.

In the second photoelectric conversion unit 32, at the time of light irradiation, a hole reaching the lower electrode 32c among charge pairs generated in the photoelectric conversion film 32a boosts a potential of the floating diffusion FD2. Since the floating diffusion FD2 is electrically connected to the gate electrode 36, a voltage applied to the gate electrode 36 is determined according to the number of generated holes. That is, since the number of holes generated at low illuminance is small and the gate voltage is kept low, generation of dark current is small. On the other hand, since the number of holes generated at high illuminance is large and the gate voltage is high, a saturation signal amount is increased.

Here, in order to obtain a sufficient amplitude in the voltage applied to the gate electrode 36, it is necessary to reduce the capacitance of the floating diffusion FD2 and to increase the number of accumulated charges (holes in this case). However, with regard to the former, since a parasitic capacitance occurs between the second photoelectric conversion unit 32 connected to the floating diffusion FD2 and the wiring, an extremely low capacitance cannot be expected. Therefore, as described above, it is effective to devise the configuration and connection of the second photoelectric conversion unit 32.

Note that, as characteristics required for the photoelectric conversion film 32a, a material having a trap level in the film is suitable instead of Si single crystal, and a material type such as amorphous or polycrystalline does not matter. Examples of the material include a low molecular/polymer organic thin film and a perovskite thin film. In a case where a material having a trap level in the film is used as the photoelectric conversion film 32a, when a positive bias is applied to the upper electrode 32b, electrons corresponding to the illuminance are captured by the trap level of the second photoelectric conversion unit 32 at the time of light irradiation, and hole injection from the upper electrode 32b is promoted, so that the number of holes reaching the lower electrode 32c is doubled (referred to as photo-multiplication). Note that, since most of the incident light needs to reach the first photoelectric conversion unit 31, a light absorption rate of the photoelectric conversion film 32a is desirably kept low by film thickness adjustment or the like.

<2-5. Schematic Configuration Example of Pixel Circuit>

Figure 5:
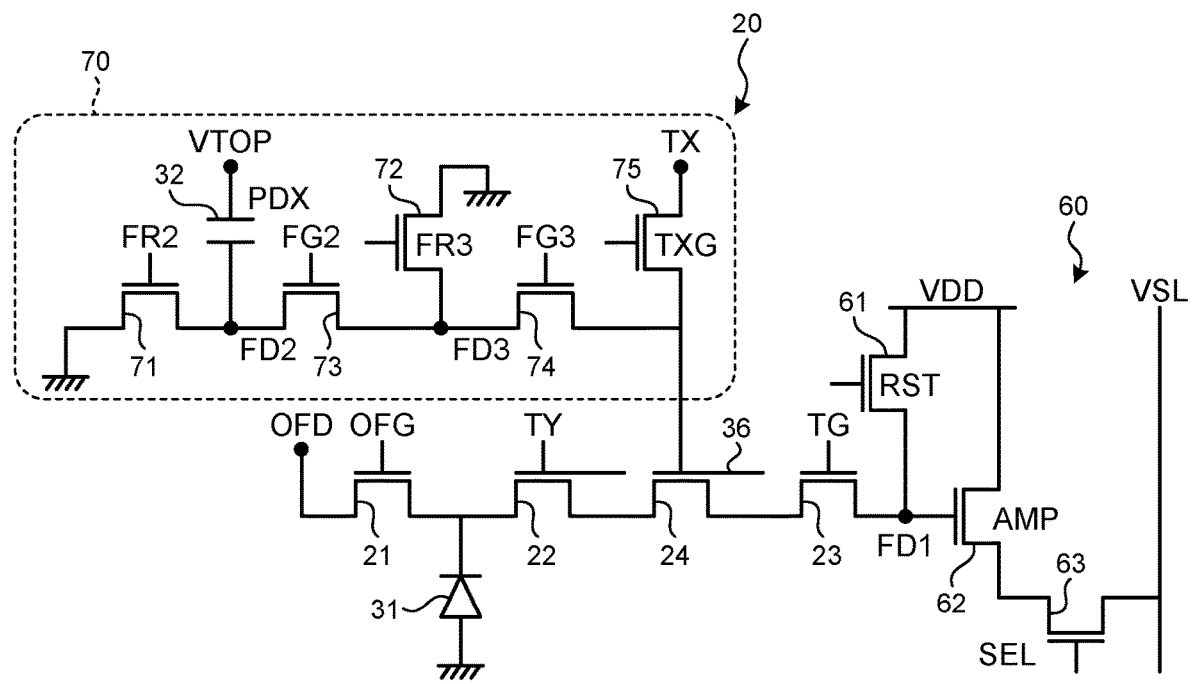
FIG. 5 is a diagram illustrating an example of a schematic configuration of a pixel circuit according to the first embodiment.

A schematic configuration example of the pixel circuit according to the first embodiment will be described with reference to FIG. 5. FIG. 5 is a diagram illustrating an example of a schematic configuration of the pixel circuit according to the first embodiment.

As illustrated in FIG. 5, each of the pixels 20 includes the first photoelectric conversion unit 31, an overflow transistor 21, a plurality of transfer transistors 22 and 23, a memory transistor 24, a floating diffusion FD1, a readout circuit 60, and a voltage application unit 70. Each of the transistors 21 to 24 is, for example, a complementary metal oxide semiconductor (CMOS) transistor.

As described above, the first photoelectric conversion unit 31 performs photoelectric conversion to generate a charge corresponding to the amount of received light. As the first photoelectric conversion unit 31, for example, a PN-junction photodiode is used. In the first photoelectric conversion unit 31, a cathode is electrically connected to the transfer transistor 22, and an anode is electrically connected to a reference potential line (for example, ground).

The overflow transistor 21 is a transistor for preventing blooming. The overflow transistor 21 is electrically connected between the cathode of the first photoelectric conversion unit 31 and an overflow layer OFD. The overflow transistor 21 discharges the charge of the first photoelectric conversion unit 31 by applying a drive signal OFG to the gate at the start of exposure.

The transfer transistor 22 is electrically connected to the first photoelectric conversion unit 31. The transfer transistor 22 transfers the charge accumulated in the first photoelectric conversion unit 31 to the charge storage unit 31a by applying a drive signal TY to the gate. Note that the transfer transistor 22 also functions as a gate for preventing backflow of charges from the charge storage unit 31a to the first photoelectric conversion unit 31.

The memory transistor 24 is electrically connected to the transfer transistor 22. The gate of the memory transistor 24, that is, the gate electrode 36 is electrically connected to an output end of the voltage application unit 70. The memory transistor 24 changes a potential of the charge storage unit 31a by applying a drive signal TX to the gate electrode 36. Specifically, when the drive signal TX is applied to the gate electrode 36, the charge storage unit 31a is modulated. That is, the potential of the charge storage unit 31a is deepened by applying the drive signal TX to the gate electrode 36. As a result, the saturation signal amount of the charge storage unit 31a can be increased as compared with a case where modulation is not applied to the charge storage unit 31a.

The transfer transistor 23 is electrically connected between the memory transistor 24 and the floating diffusion FD1. The transfer transistor 23 transfers the charge from the charge storage unit 31a to the floating diffusion FD1 by applying a drive signal TG to the gate. Note that the transfer transistor 23 also functions as a gate for preventing backflow of charges from the floating diffusion FD1 to the charge storage unit 31a.

The floating diffusion FD1 is electrically connected to an input end of the readout circuit 60. The floating diffusion FD1 temporarily retains the charge output from the charge storage unit 31a and transferred by the transfer transistor 23. The floating diffusion FD1 is an example of a floating diffusion layer (floating diffusion region).

The readout circuit 60 includes, for example, a reset transistor 61, an amplification transistor 62, and a selection transistor 63. The reset transistor 61, the amplification transistor 62, and the selection transistor 63 are, for example, CMOS transistors.

The reset transistor 61 is electrically connected between a power supply line VDD and the floating diffusion FD1. In the reset transistor 61, for example, the drain is electrically connected to the power supply line VDD, and the source is electrically connected to the floating diffusion FD1. The reset transistor 61 resets a potential of the floating diffusion FD1 to a potential of the power supply line VDD by applying a drive signal RST to the gate.

The amplification transistor 62 is a transistor for voltage amplification. In the amplification transistor 62, for example, the drain is electrically connected to the power supply line VDD, and the gate is electrically connected to the floating diffusion FD1. The amplification transistor 62 amplifies the potential of the floating diffusion FD1 and generates a voltage corresponding to the amplified potential as a pixel signal.

The selection transistor 63 is a transistor for pixel selection. In the selection transistor 63, for example, the drain is electrically connected to the source of the amplification transistor 62, and the source is electrically connected to the vertical signal line 17 (VSL). The selection transistor 63 selects the pixels 20 from which the pixel signals are to be read by applying a drive signal SEL to the gate. That is, the selection transistor 63 controls the output timing of the pixel signals from the readout circuit 60.

Note that the selection transistor 63 may be connected between the power supply line VDD and the drain of the amplification transistor 62. Furthermore, one or a plurality of the reset transistor 61, the amplification transistor 62, and the selection transistor 63 can be omitted depending on a method of reading the pixel signals, or another transistor can be added.

The voltage application unit 70 includes, for example, a second photoelectric conversion unit 32, a plurality of reset transistors 71 and 72, a plurality of transfer transistors 73 and 74, and a switch transistor 75. Note that one or a plurality of the voltage application units 70 can be omitted depending on a pixel signal reading method or a voltage control method, or another transistor or element can be added.

As described above, the second photoelectric conversion unit 32 performs photoelectric conversion to generate a charge corresponding to the amount of received light. The second photoelectric conversion unit 32 is electrically connected to the floating diffusion FD2. The floating diffusion FD2 temporarily retains the charge output from the second photoelectric conversion unit 32. The floating diffusion FD2 is an example of a floating diffusion layer (floating diffusion region), and functions as a part of the voltage application unit 70, for example.

The reset transistor 71 is electrically connected between the reference potential line (for example, ground) and the floating diffusion FD2. The reset transistor 71 resets the potential of the floating diffusion FD2 to the reference potential by applying a drive signal FR2 to the gate.

The transfer transistor 73 is electrically connected between the floating diffusion FD2 and a floating diffusion FD3. The transfer transistor 73 transfers the charge of the floating diffusion FD2 to the floating diffusion FD3 by applying a drive signal FG2 to the gate. The floating diffusion FD3 temporarily retains the charge output from the floating diffusion FD2. The floating diffusion FD3 is an example of a floating diffusion layer (floating diffusion region), and functions as a part of the voltage application unit 70, for example.

The reset transistor 72 is electrically connected between the reference potential line (for example, ground) and the floating diffusion FD3. The reset transistor 72 resets a potential of the floating diffusion FD3 to the reference potential by applying a drive signal FR3 to the gate.

The transfer transistor 74 is electrically connected between the floating diffusion FD3 and the gate electrode 36 of the memory transistor 24. When a drive signal FG3 is applied to the gate of the transfer transistor 74, the charge of the floating diffusion FD3 is transferred to the gate electrode 36 of the memory transistor 24.

The switch transistor 75 is electrically connected between a signal line (pixel drive line 16) for inputting the drive signal TX and the gate electrode 36 of the memory transistor 24. For example, one end (source or drain) of the switch transistor 75 is electrically connected to both the gate electrode 36 of the memory transistor 24 and one end (source or drain) of the transfer transistor 74. When a drive signal TXG is applied to the gate of the switch transistor 75, the drive signal TX is input to the gate electrode 36 of the memory transistor 24. A voltage (TX voltage) of the drive signal TX is adjusted by the voltage application unit 70.

Note that, in the above-described various transistors, a drive signal is applied to a gate (gate electrode), and each gate of the various transistors is electrically connected to each signal line constituting the pixel drive line 16 (See FIG. 2). Therefore, the drive signal is input to each transistor via the signal line.

<2-4. Operation Example of Pixel Circuit>

Figure 6:
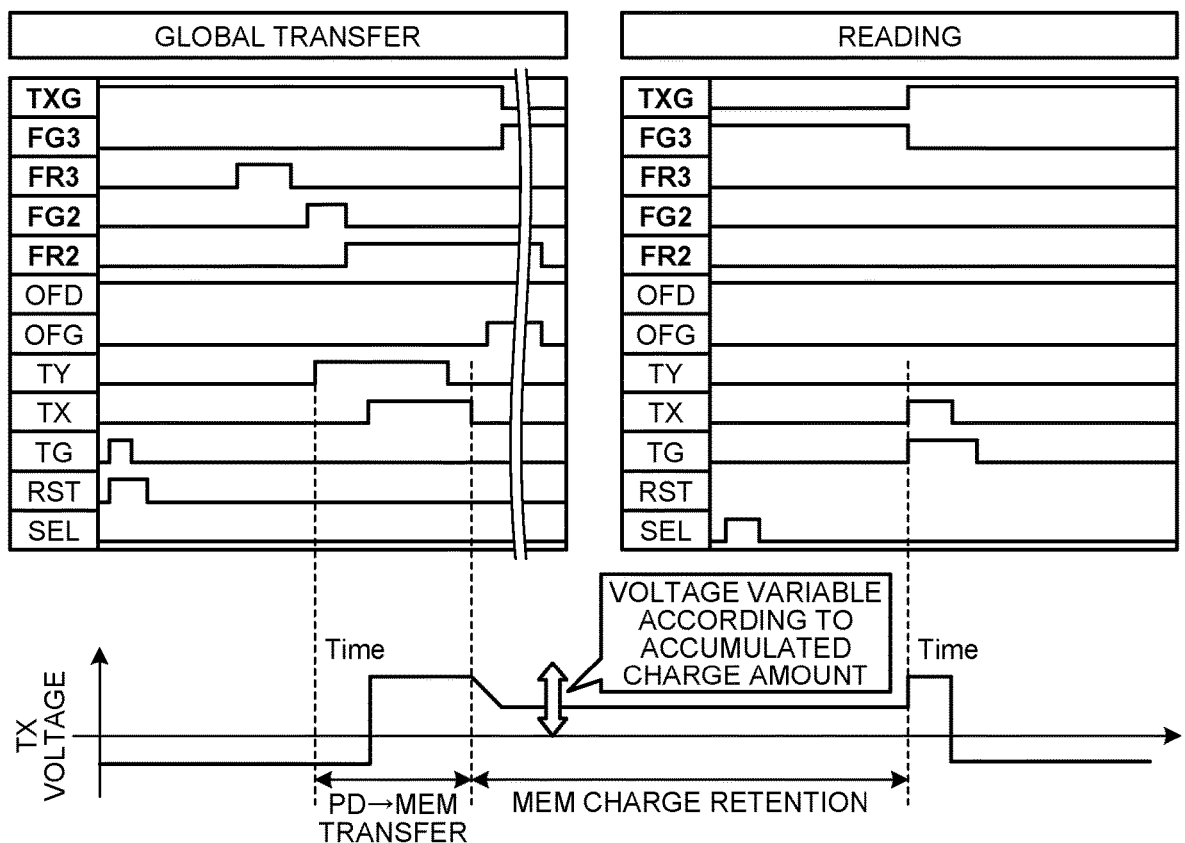
FIG. 6 is a diagram illustrating an example of a timing chart regarding transfer and reading according to the first embodiment.

An operation example of the pixel circuit according to the first embodiment will be described with reference to FIG. 6. FIG. 6 is a diagram illustrating an example of a timing chart regarding transfer and reading according to the first embodiment.

As illustrated in FIG. 6, the drive signal TY is turned ON, and the exposure of the first photoelectric conversion unit 31 and the second photoelectric conversion unit 32 ends at the timing of charge transfer from the first photoelectric conversion unit 31 to the charge storage unit 31a (PD→MEM). Then, when the drive signal FG2 is turned ON, the potential fluctuation of the floating diffusion FD2 is propagated and held in the floating diffusion FD3 reset to the GND level in advance. At this time, the capacitance of the floating diffusion FD3 is preferably smaller than that of the floating diffusion FD2.

When the drive signal TX is turned OFF, the drive signal FG3 is turned ON at the same time as the charge storage unit 31a (MEM) starts retaining the charge, and the drive signal TXG is turned OFF, the external voltage (drive signal TX) is cut off, and the potential of the floating diffusion FD3 is applied to the gate electrode 36 of the charge storage unit 31a (MEM). As a result, the gate voltage in the MEM retention period is adjusted according to the accumulated charge amount in the same frame. After being retained for a certain period of time, the signal reading of each row is completed in the rolling operation. Note that, at the reading timing, the drive signal TXG is turned ON, the drive signal FG3 is turned OFF, and the drive signals TX and TG are turned ON.

By using the above-described voltage application unit 70, the voltage to be applied to the gate electrode 36 of the charge storage unit 31a can be adjusted according to the accumulated charge amount (accumulated charge number) of the second photoelectric conversion unit 32. As a result, as illustrated in FIG. 6, the gate voltage (TX voltage) of the charge storage unit 31a during the charge retention (MEM charge retention) period can be changed. That is, by changing the gate voltage of the charge storage unit 31a according to the illuminance of the incident light, it is possible to increase the saturation signal amount of the charge storage unit 31a while suppressing generation of dark current. That is, the dynamic range can be expanded by expanding the saturation signal amount under high illuminance while suppressing generation of dark current under low illuminance.

<2-6. Working and Effect>

As described above, according to the first embodiment, by changing the voltage applied to the gate electrode 36 of the charge storage unit 31a according to the illuminance of light incident on the first photoelectric conversion unit 31, it is possible to increase the saturation signal amount while suppressing generation of dark current, and thus, it is possible to expand the dynamic range. For example, the dynamic range can be expanded by expanding the saturation signal amount under high illuminance while suppressing generation of dark current under low illuminance.

3. Second Embodiment

Figure 7:
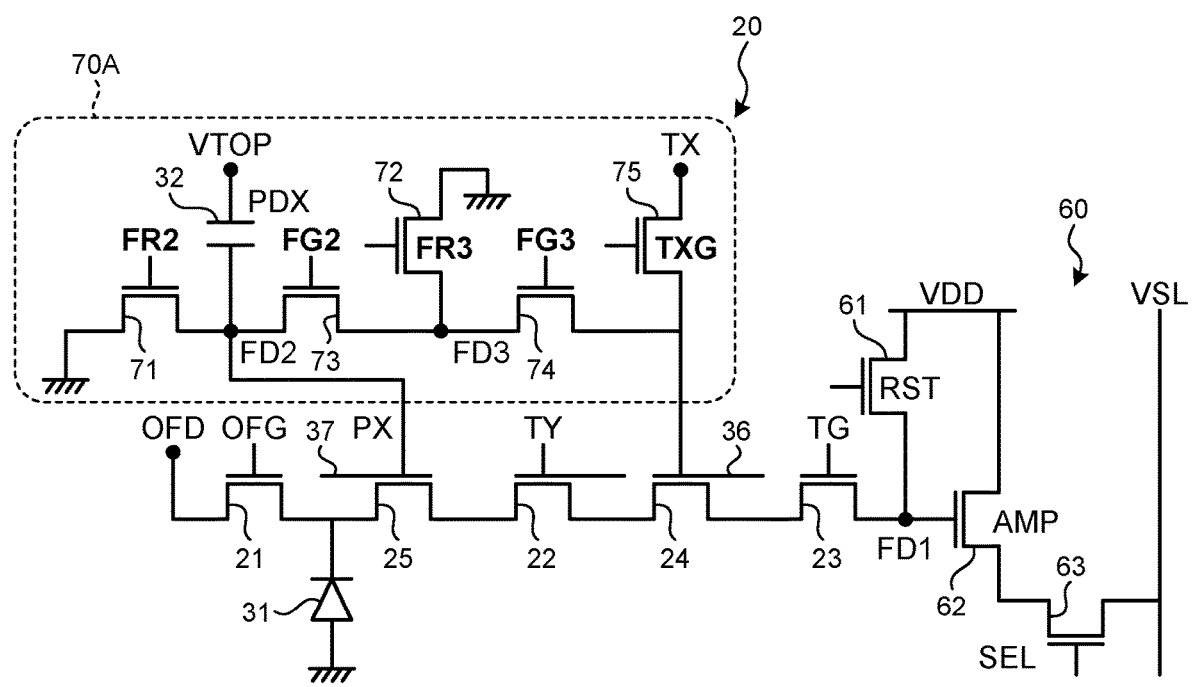
FIG. 7 is a diagram illustrating an example of a schematic configuration of a pixel circuit according to a second embodiment.
Figure 8:
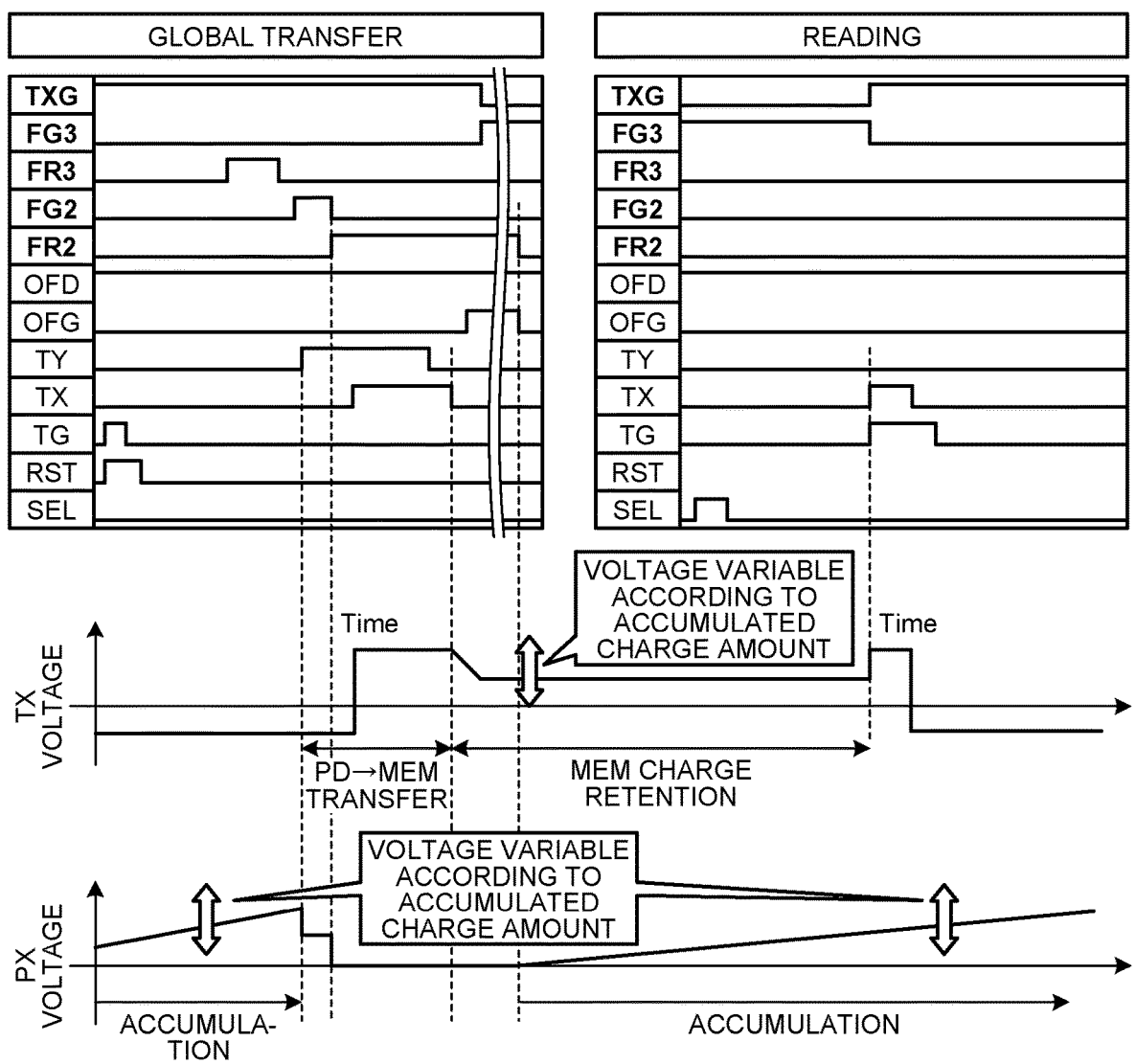
FIG. 8 is a diagram illustrating an example of a timing chart regarding transfer and reading according to the second embodiment.

A schematic configuration example and an operation example of a voltage application unit 70A according to a second embodiment will be described with reference to FIGS. 7 and 8. FIG. 7 is a diagram illustrating an example of a schematic configuration of the voltage application unit 70A according to the second embodiment. FIG. 8 is a diagram illustrating an example of a timing chart regarding transfer and reading according to the second embodiment. Hereinafter, differences from the first embodiment will be mainly described, and other descriptions will be omitted.

As illustrated in FIG. 7, the voltage application unit 70A according to the second embodiment has basically the same configuration as the voltage application unit 70 according to the first embodiment, and is a mechanism that adjusts a voltage to be applied to a predetermined gate according to an accumulated charge amount of the second photoelectric conversion unit 32. This mechanism is effective not only in the charge storage unit 31a but also in the first photoelectric conversion unit 31 in which a gate electrode 37 is disposed. The gate electrode 37 is provided with respect to the first photoelectric conversion unit 31 via the lower insulating film 35 (See FIG. 3.) while avoiding the gate electrode 36. That is, a difference between the second embodiment and the first embodiment is that the floating diffusion FD2 is electrically connected to the gate electrode 37 of the first photoelectric conversion unit 31 as illustrated in FIG. 7. Specifically, a transfer transistor 25 is electrically provided between the first photoelectric conversion unit 31 and the transfer transistor 22, and the gate of the transfer transistor 25 functions as the gate electrode 37.

In the second embodiment and the first embodiment, the driving method of the pixel circuit is the same, but by using the above-described voltage application unit 70A, as illustrated in FIG. 8, not only the gate voltage (TX voltage) of the charge storage unit 31a during the charge retention (MEM charge retention) period but also the gate voltage (PX voltage) can be changed according to the accumulated charge amount (the number of charges) during the charge accumulation in the second photoelectric conversion unit 32. The gate voltage increases as the accumulated charge amount increases, and decreases as the accumulated charge amount decreases. As a result, it is possible to increase the saturation signal amount of both the first photoelectric conversion unit 31 and the charge storage unit 31a while suppressing generation of dark current.

As described above, according to the second embodiment, the same effects as those of the first embodiment can be obtained. That is, it is possible to expand the saturation signal amount of both the first photoelectric conversion unit 31 and the charge storage unit 31a while suppressing the generation of the dark current, and it is possible to expand the dynamic range.

4. Third Embodiment

Figure 9:
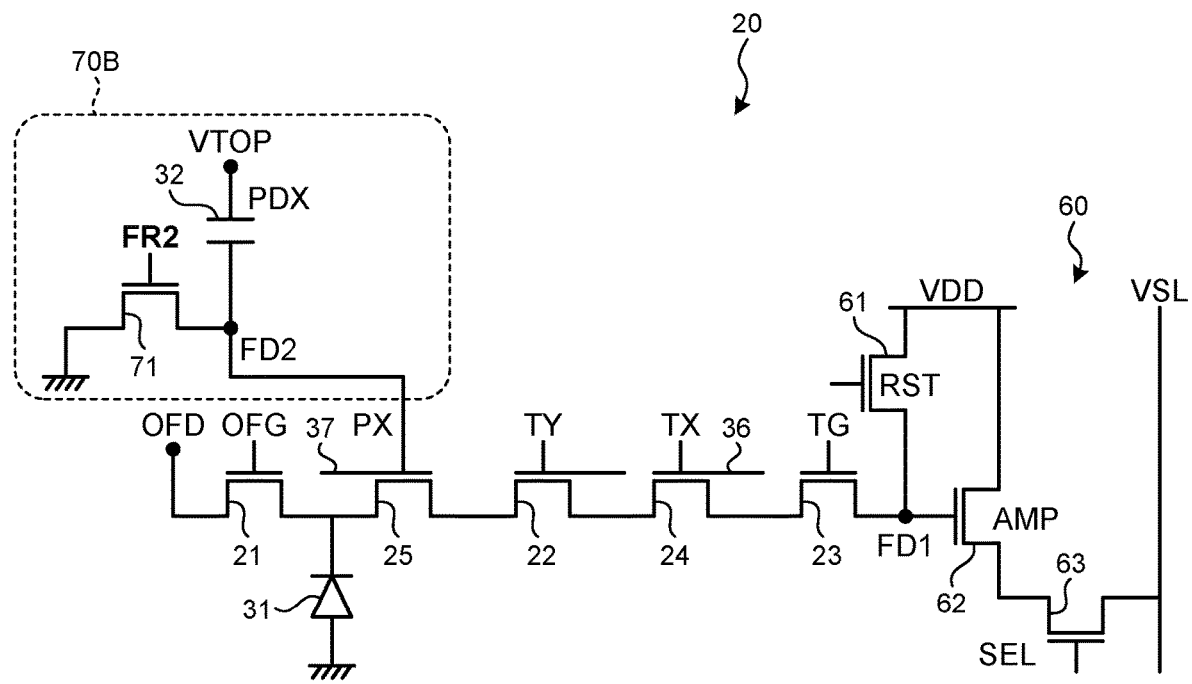
FIG. 9 is a diagram illustrating an example of a schematic configuration of a pixel circuit according to a third embodiment.
Figure 10:
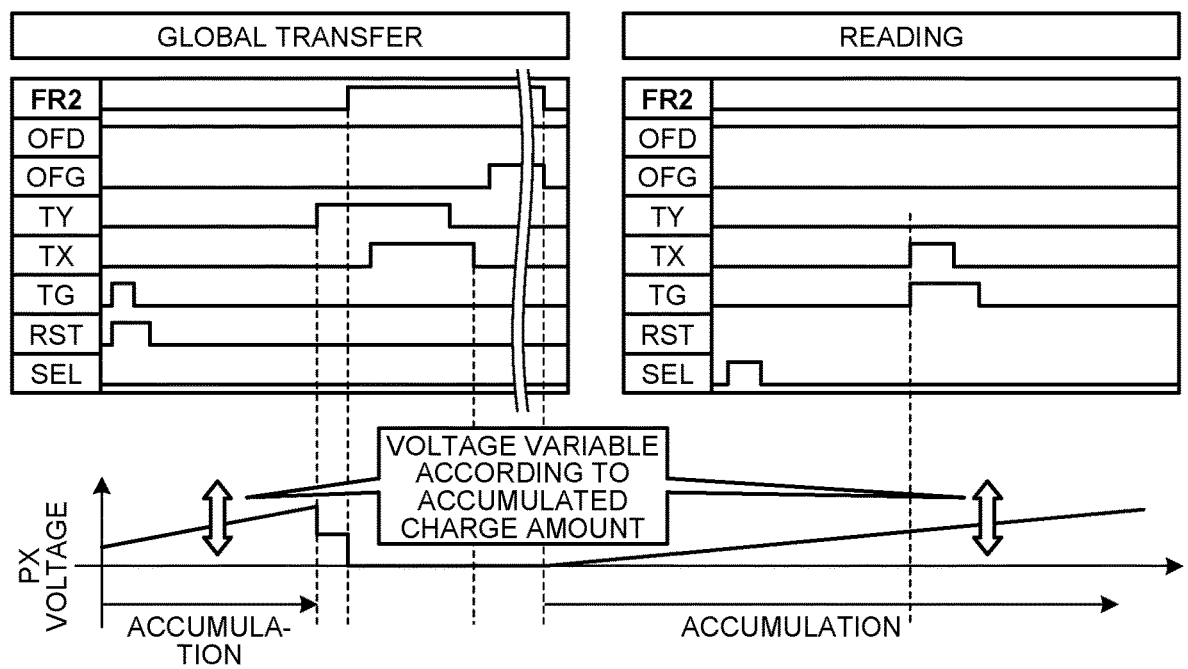
FIG. 10 is a diagram illustrating an example of a timing chart regarding transfer and reading according to the third embodiment.

A schematic configuration example and an operation example of a voltage application unit 70B according to a third embodiment will be described with reference to FIGS. 9 and 10. FIG. 9 is a diagram illustrating an example of a schematic configuration of the voltage application unit 70B according to the third embodiment. FIG. 10 is a diagram illustrating an example of a timing chart regarding transfer and reading according to the third embodiment. Hereinafter, differences from the second embodiment will be mainly described, and other descriptions will be omitted.

As illustrated in FIG. 9, the voltage application unit 70B according to the third embodiment is obtained by applying a mechanism for adjusting a voltage to be applied to a predetermined gate according to the accumulated charge amount of the second photoelectric conversion unit 32 to only the first photoelectric conversion unit 31 in which the gate electrode 37 is disposed. By using the voltage application unit 70B, as illustrated in FIG. 10, the gate voltage (PX voltage) can be changed according to the accumulated charge amount during the charge accumulation in the second photoelectric conversion unit 32. The gate voltage increases as the accumulated charge amount increases, and decreases as the accumulated charge amount decreases. As a result, it is possible to increase the saturation signal amount of the first photoelectric conversion unit 31 while suppressing generation of dark current.

As described above, according to the third embodiment, the same effects as those of the second embodiment can be obtained. That is, it is possible to expand the saturation signal amount of the first photoelectric conversion unit 31 while suppressing the generation of the dark current, and it is possible to expand the dynamic range.

5. Fourth Embodiment

Figure 11:
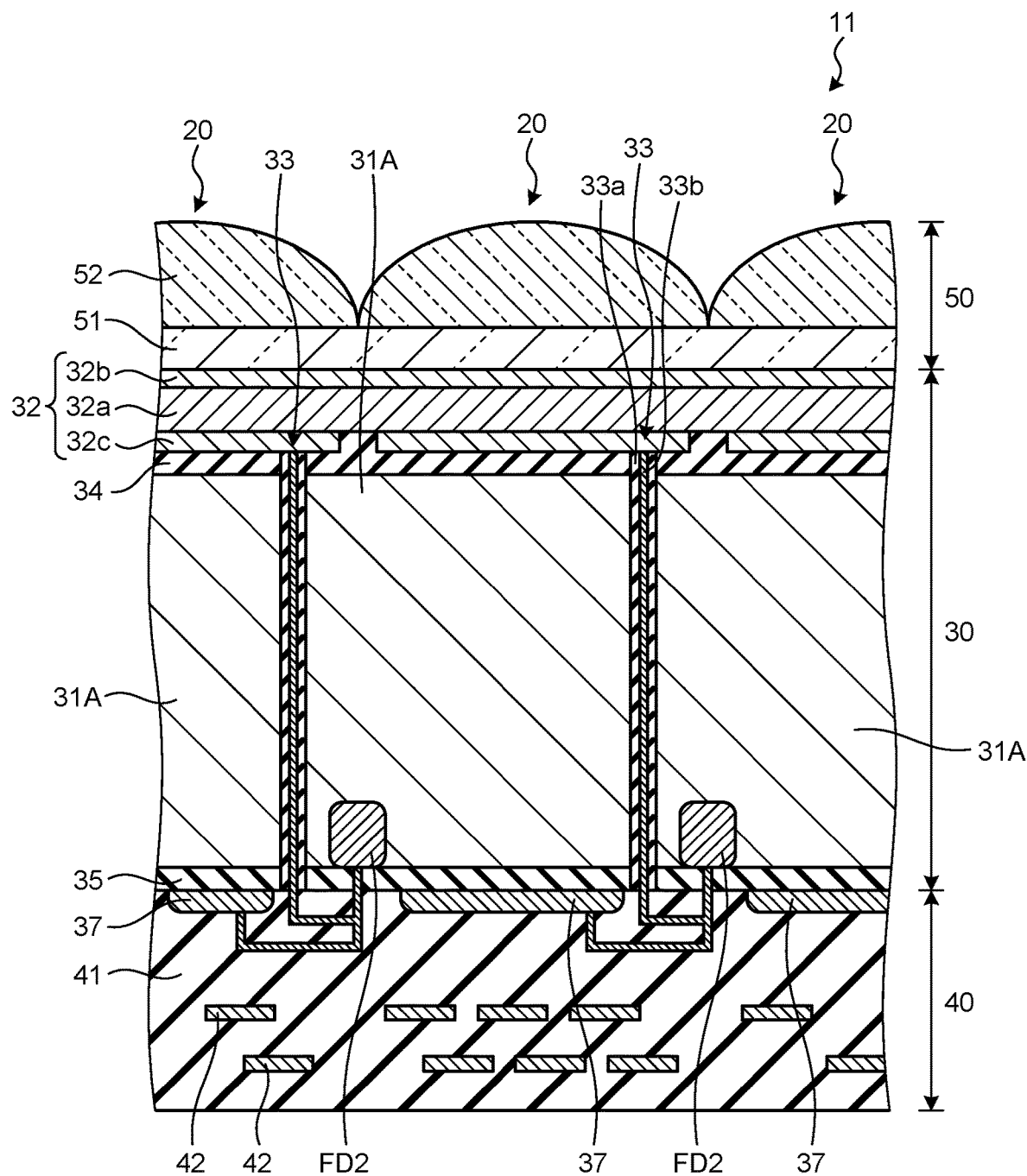
FIG. 11 is a cross-sectional view illustrating an example of a schematic configuration of a pixel array unit according to a fourth embodiment.
Figure 12:
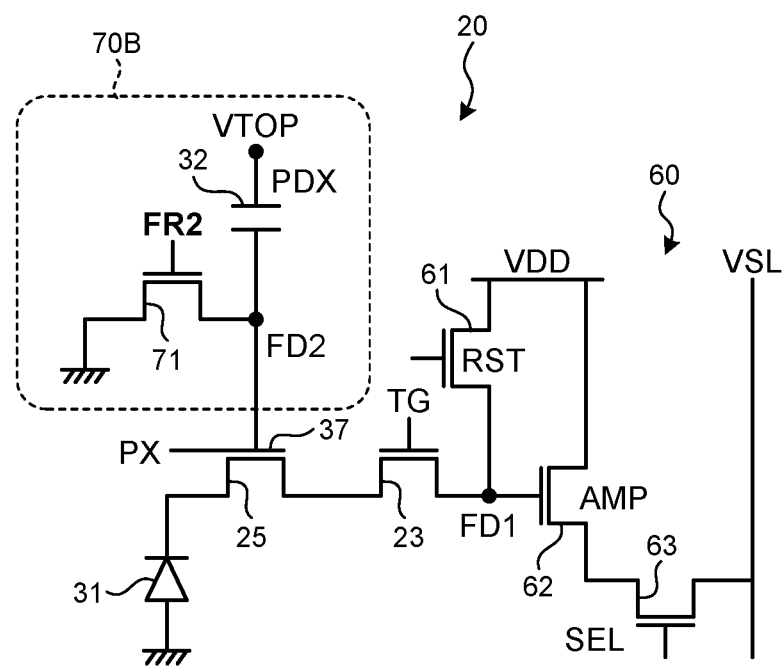
FIG. 12 is a diagram illustrating an example of a schematic configuration of a pixel circuit according to the fourth embodiment.
Figure 13:
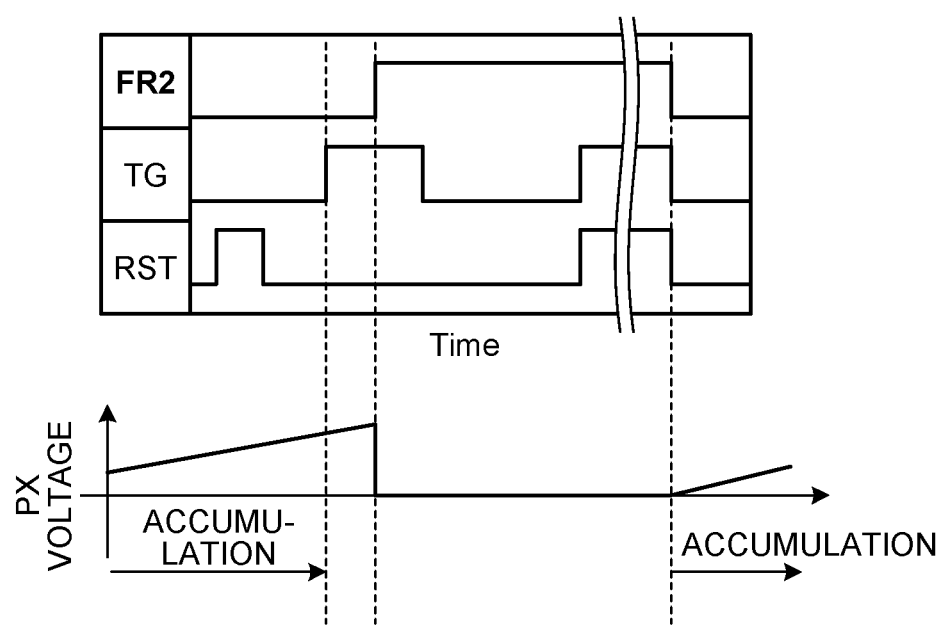
FIG. 13 is a diagram illustrating an example of a timing chart regarding transfer and reading according to the fourth embodiment.

A schematic configuration example and an operation example of a pixel array unit 11 and a voltage application unit 70B according to a fourth embodiment will be described with reference to FIGS. 11 to 13. FIG. 11 is a diagram illustrating an example of a schematic configuration of the pixel array unit 11 according to the fourth embodiment. FIG. 12 is a diagram illustrating an example of a schematic configuration of the voltage application unit 70B according to the fourth embodiment. FIG. 13 is a diagram illustrating an example of a timing chart regarding transfer and reading according to the fourth embodiment. Hereinafter, differences from the third embodiment will be mainly described, and other descriptions will be omitted.

As illustrated in FIG. 11, the pixel array unit 11 according to the fourth embodiment does not include the charge storage unit 31a. That is, a difference between the fourth embodiment and the third embodiment is the presence or absence of the charge storage unit 31a. As illustrated in FIG. 12, in the fourth embodiment, the voltage application unit 70B exists similarly to the third embodiment, but the transfer transistor 22 and the memory transistor 24 (See FIG. 11.) according to the third embodiment do not exist.

As illustrated in FIG. 13, as an example at the time of the rolling operation, in the selected row, the exposure of the next frame is started at the same time when the drive signal TG is turned OFF, but also in the second photoelectric conversion unit 32, the charge accumulation in the floating diffusion FD2 is started by turning OFF the drive signal FR2 at the same timing. By boosting the potential of the floating diffusion FD2 according to the charge accumulation amount, the gate voltage (PX voltage) of the first photoelectric conversion unit 31 is also boosted.

As described above, by using the voltage application unit 70B, as illustrated in FIG. 13, the gate voltage (PX voltage) can be changed according to the accumulated charge amount during the charge accumulation in the second photoelectric conversion unit 32. The gate voltage increases as the accumulated charge amount increases, and decreases as the accumulated charge amount decreases. As a result, the saturation signal amount of the first photoelectric conversion unit 31 can be increased.

As described above, according to the fourth embodiment, the same effects as those of the third embodiment can be obtained. That is, the saturation signal amount of the first photoelectric conversion unit 31 can be expanded, and the dynamic range can be expanded.

6. Other Embodiments

The processing according to the above embodiments may be performed in various different forms (modifications) other than the above embodiments. For example, the configuration is not limited to the above-described example, and may be various modes. Furthermore, for example, the configuration, the processing procedure, the specific name, and the information including various data and parameters illustrated in the document or the drawings can be arbitrarily changed unless otherwise specified.

Furthermore, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like.

In the above embodiments and modifications, the conductivity types such as p-type and n-type may be reversed. Even in such a case, the same effects as those of each embodiment and each modification can be obtained.

Furthermore, in each of the above embodiments and modifications, both or one of the gate electrode 36 and the gate electrode 37 may be divided in a plane. That is, a plurality of the gate electrodes 36 may be disposed with respect to the charge storage unit 31a via the lower insulating film 35, and a plurality of the gate electrodes 37 may be disposed with respect to the first photoelectric conversion unit 31 via the lower insulating film 35. By increasing the number of gate electrodes, it is possible to suppress untransferred charges. The division number of the gate electrode 36 and the division number of the gate electrode 37 may be the same or different. Note that the voltage applied to both or one of the gate electrode 36 and the gate electrode 37 is adjusted according to the accumulated charge amount of the second photoelectric conversion unit 32. The gate electrode 36 or the gate electrode 37 is an example of a first gate electrode or a second gate electrode.

Furthermore, the solid-state imaging element 10 according to each of the above-described embodiments and modifications can be applied not only as a visible light receiving element but also to an element capable of detecting various types of radiation such as infrared rays, ultraviolet rays, X-rays, and electromagnetic waves. The present invention can also be applied to various applications such as distance measurement, change in light amount, and detection of physical properties in addition to image output.

7. Application Example

The solid-state imaging element 10 according to each of the above embodiments and modifications is applied to an imaging device. The imaging device is, for example, an electronic device such as a digital still camera, a video camera, a smartphone, a tablet terminal, a mobile phone, a personal digital assistant (PDA), a notebook personal computer (PC), or a desktop PC.

Figure 14:
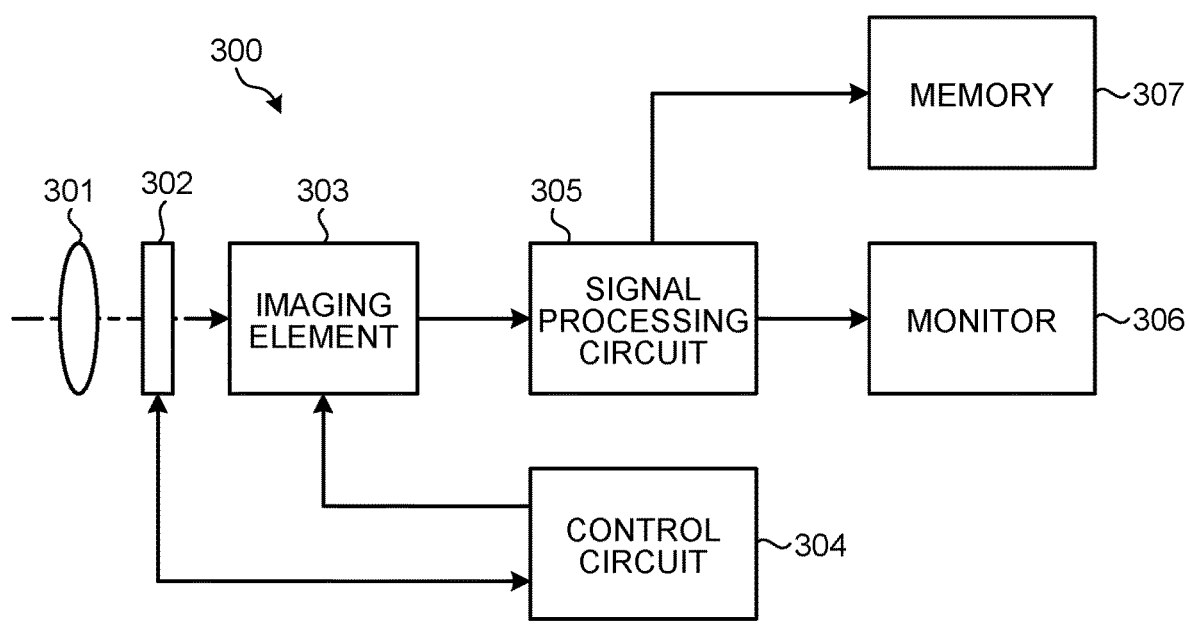
FIG. 14 is a diagram illustrating an example of a schematic configuration of an imaging device.

An example of an imaging device 300 will be described with reference to FIG. 14. FIG. 14 is a block diagram illustrating an example of a schematic configuration of the imaging device 300 as an electronic device to which the present technique is applied.

As illustrated in FIG. 14, the imaging device 300 includes an optical system 301, a shutter device 302, an imaging element 303, a control circuit (drive circuit) 304, a signal processing circuit 305, a monitor 306, and a memory 307. The imaging device 300 can capture a still image and a moving image. The imaging element 303 is any of the solid-state imaging elements 10 according to the above-described embodiments and modifications.

The optical system 301 includes one or a plurality of lenses. The optical system 301 guides light (incident light) from a subject to the imaging element 303 and forms an image on a light receiving surface of the imaging element 303.

The shutter device 302 is disposed between the optical system 301 and the imaging element 303. The shutter device 302 controls a light irradiation period and a light shielding period with respect to the imaging element 303 according to the control of the control circuit 304.

The imaging element 303 accumulates signal charges for a certain period according to light formed on the light receiving surface via the optical system 301 and the shutter device 302. The signal charges accumulated in the imaging element 303 are transferred in accordance with a drive signal (timing signal) supplied from the control circuit 304.

The control circuit 304 outputs a drive signal for controlling the transfer operation of the imaging element 303 and the shutter operation of the shutter device 302 to drive the imaging element 303 and the shutter device 302.

The signal processing circuit 305 performs various types of signal processing on the signal charges output from the imaging element 303. An image (image data) obtained by performing the signal processing by the signal processing circuit 305 is supplied to the monitor 306 and also supplied to the memory 307.

The monitor 306 displays a moving image or a still image captured by the imaging element 303 on the basis of the image data supplied from the signal processing circuit 305. As the monitor 306, for example, a panel type display device such as a liquid crystal panel or an organic electro luminescence (EL) panel is used.

The memory 307 stores the image data supplied from the signal processing circuit 305, that is, image data of a moving image or a still image captured by the imaging element 303. As the memory 307, for example, a recording medium such as a semiconductor memory or a hard disk is used.

Also in the imaging device 300 configured as described above, the dynamic range can be expanded by using any one of the solid-state imaging elements 10 according to the above-described embodiments and modifications as the imaging element 303.

8. Application Example

The technique according to the present disclosure can be further applied to various products. For example, the technique according to the present disclosure may be realized as a device mounted on any type of mobile body such as an automobile, an electric vehicle, a hybrid electric vehicle, a motorcycle, a bicycle, a personal mobility, an airplane, a drone, a ship, a robot, a construction machine, or an agricultural machine (tractor). Furthermore, for example, the technique according to the present disclosure may be applied to an endoscopic surgical system, a microscopic surgical system, or the like.

Figure 15:
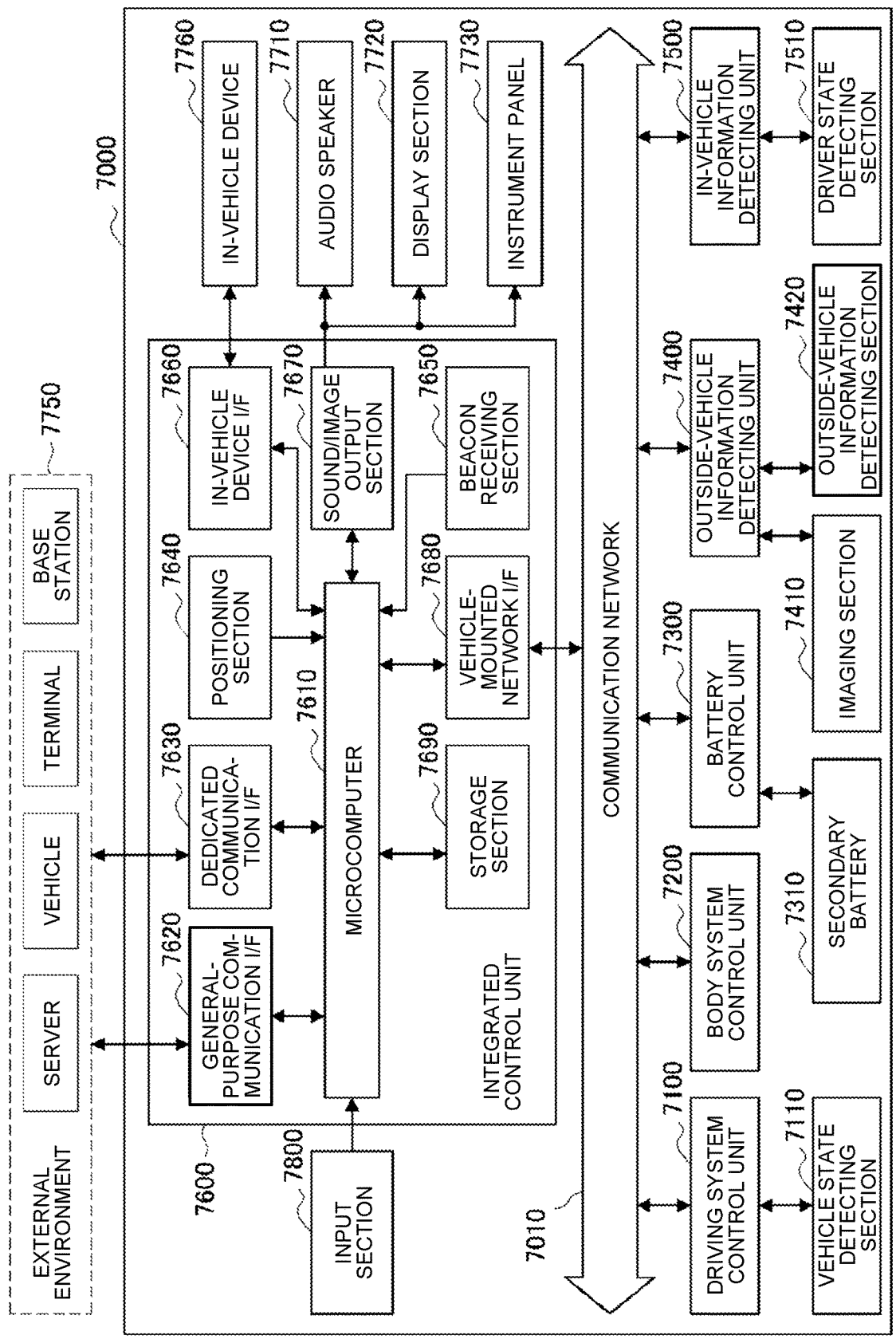
FIG. 15 is a block diagram depicting an example of schematic configuration of a vehicle control system.

FIG. 15 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 15, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 15 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 16:
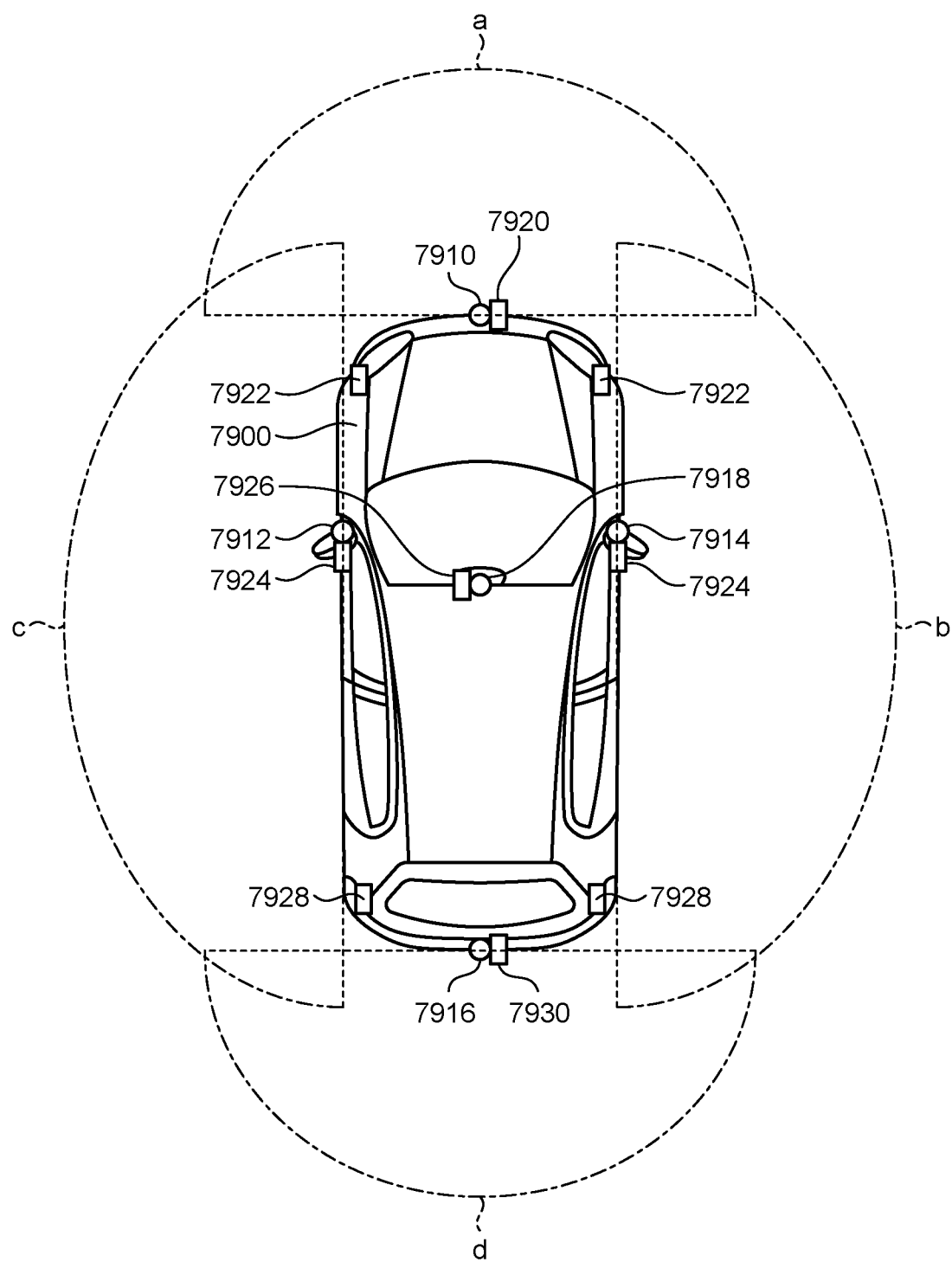
FIG. 16 is a diagram of assistance in explaining an example of installation positions of an outside-vehicle information detecting section and an imaging section.

FIG. 16 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 16 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 15, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears.

Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 15, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 15 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Note that a computer program for realizing each function of the imaging device 300 according to the application example described with reference to FIG. 14 can be mounted on any control unit or the like. Furthermore, it is also possible to provide a computer-readable recording medium storing such a computer program. The recording medium is, for example, a magnetic disk, an optical disk, a magneto-optical disk, a flash memory, or the like. Furthermore, the computer program described above may be distributed via, for example, a network without using a recording medium.

In the vehicle control system 7000 described above, the imaging device 300 according to the application example described with reference to FIG. 14 can be applied to the integrated control unit 7600 of the application example illustrated in FIG. 15. For example, the control circuit 304, the signal processing circuit 305, and the memory 307 of the imaging device 300 may be realized by the microcomputer 7610 or the storage section 7690 of the integrated control unit 7600. Furthermore, the solid-state imaging element 10 according to each of the above-described embodiments and modifications can be applied to the imaging section 7410 and the outside-vehicle information detecting section 7420 of the application example illustrated in FIG. 15, for example, the imaging sections 7910, 7912, 7914, 7916, and 7918, the outside-vehicle information detecting sections 7920 to 7930, and the like of the application example illustrated in FIG. 16. The dynamic range can also be expanded in the vehicle control system 7000 by using any of the solid-state imaging elements 10 according to the above-described embodiments and modifications.

Furthermore, at least some components of the imaging device 300 according to the application example described with reference to FIG. 14 may be realized in a module (for example, an integrated circuit module including one die) for the integrated control unit 7600 of the application example illustrated in FIG. 15. Alternatively, a part of the imaging device 300 according to the application example described with reference to FIG. 14 may be realized by a plurality of control units of the vehicle control system 7000 illustrated in FIG. 15.

9. Supplementary Note

Note that the present technique can also have the following configurations.

(1)
A solid-state imaging element comprising:
a first photoelectric conversion unit including a light incident surface on which light is incident;
a first gate electrode provided in the first photoelectric conversion unit via an insulating film;
a second photoelectric conversion unit provided on a side of the light incident surface with respect to the first photoelectric conversion unit; and
a voltage application unit that applies a voltage corresponding to a number of charges accumulated by the second photoelectric conversion unit to the first gate electrode.

(2)
The solid-state imaging element according to (1), wherein the first photoelectric conversion unit includes
a charge storage unit provided at a position facing the first gate electrode.

(3)
The solid-state imaging element according to (1), further comprising
a second gate electrode provided in the first photoelectric conversion unit via the insulating film, wherein
the first photoelectric conversion unit includes
a charge storage unit provided at a position facing the second gate electrode.

(4)
The solid-state imaging element according to (3), wherein the voltage application unit applies the voltage to the first gate electrode and the second gate electrode.

(5)
The solid-state imaging element according to (1), wherein the first gate electrode is divided in a plane.

(6)
The solid-state imaging element according to (2), wherein the first gate electrode is divided in a plane.

(7)
The solid-state imaging element according to (3), wherein the first gate electrode is divided in a plane.

(8)
The solid-state imaging element according to (3), wherein the second gate electrode is divided in a plane.

(9)
The solid-state imaging element according to (4), wherein the first gate electrode is divided in a plane.

(10)
The solid-state imaging element according to (4), wherein the second gate electrode is divided in a plane.

(11)
The solid-state imaging element according to any one of (1) to (10), wherein
the voltage application unit includes a floating diffusion layer.

(12)
An imaging device comprising
a solid-state imaging element, wherein
the solid-state imaging element includes:
a first photoelectric conversion unit including a light incident surface on which light is incident;
a first gate electrode provided in the first photoelectric conversion unit via an insulating film;
a second photoelectric conversion unit provided on a side of the light incident surface with respect to the first photoelectric conversion unit; and
a voltage application unit that applies a voltage corresponding to a number of charges accumulated by the second photoelectric conversion unit to the first gate electrode.

(13)
A solid-state imaging element comprising:
a photoelectric conversion unit;
a gate electrode provided in the photoelectric conversion unit via an insulating film; and
a voltage application unit that changes a voltage to be applied to the gate electrode according to illuminance of light incident on the photoelectric conversion unit.

(14)
A method of controlling a solid-state imaging element including a photoelectric conversion unit and a gate electrode provided in the photoelectric conversion unit via an insulating film, the method comprising
changing a voltage to be applied to the gate electrode according to illuminance of light incident on the solid-state imaging element.

(15)
An imaging device including the solid-state imaging element according to any one of (1) to (11).

(16)
A method of controlling a solid-state imaging element, the method including controlling the solid-state imaging element according to any one of (1) to (11).

REFERENCE SIGNS LIST

10 SOLID-STATE IMAGING ELEMENT
11 PIXEL ARRAY UNIT
12 VERTICAL DRIVE UNIT
13 COLUMN PROCESSING UNIT
14 HORIZONTAL DRIVE UNIT
15 SYSTEM CONTROL UNIT
16 PIXEL DRIVE LINE
17 VERTICAL SIGNAL LINE
18 SIGNAL PROCESSING UNIT
19 DATA STORAGE UNIT
20 PIXEL

21 OVERFLOW TRANSISTOR
22 TRANSFER TRANSISTOR
23 TRANSFER TRANSISTOR
24 MEMORY TRANSISTOR
25 TRANSFER TRANSISTOR
30 SEMICONDUCTOR LAYER
31 FIRST PHOTOELECTRIC CONVERSION UNIT
31a CHARGE STORAGE UNIT
32 SECOND PHOTOELECTRIC CONVERSION UNIT
32a PHOTOELECTRIC CONVERSION FILM
32b UPPER ELECTRODE
32c LOWER ELECTRODE
33 ELEMENT ISOLATION PORTION
33a INSULATING FILM
33b WIRING
34 UPPER INSULATING FILM
35 LOWER INSULATING FILM
36 GATE ELECTRODE
37 GATE ELECTRODE
40 WIRING LAYER
41 INSULATING LAYER
42 WIRING
50 OPTICAL LAYER
51 COLOR FILTER
52 ON-CHIP LENS
60 READ CIRCUIT
61 RESET TRANSISTOR
62 AMPLIFICATION TRANSISTOR
63 SELECTION TRANSISTOR
70 VOLTAGE APPLICATION UNIT
70A VOLTAGE APPLICATION UNIT
70B VOLTAGE APPLICATION UNIT
71 RESET TRANSISTOR
72 RESET TRANSISTOR
73 TRANSFER TRANSISTOR
74 TRANSFER TRANSISTOR
75 SWITCH TRANSISTOR
300 IMAGING DEVICE
301 OPTICAL SYSTEM
302 SHUTTER DEVICE
303 IMAGING ELEMENT
304 CONTROL CIRCUIT
305 SIGNAL PROCESSING UNIT
306 MONITOR
307 MEMORY
FD1 FLOATING DIFFUSION
FD2 FLOATING DIFFUSION
FD3 FLOATING DIFFUSION

The invention claimed is:

1. A solid-state imaging element, comprising:
a first photodiode including:
  a light incident surface on which light is incident; and
  a memory;
an insulating film;
a first gate electrode, via the insulating film, on the first photodiode, wherein
  the insulating film is between the first gate electrode and the first photodiode, and
  the memory is at a position facing the first gate electrode;
a second photodiode on a side of the light incident surface with respect to the first photodiode; and
a voltage application unit configured to apply, to the first gate electrode, a voltage corresponding to a number of charges accumulated by the second photodiode.

2. The solid-state imaging element according to claim 1, further comprising a second gate electrode, via the insulating film, on the first photodiode, wherein
  the insulating film is between the second gate electrode and the first photodiode, and
  the memory is at a position facing the second gate electrode.

3. The solid-state imaging element according to claim 2, wherein the voltage application unit is further configured to apply the voltage to the second gate electrode.

4. The solid-state imaging element according to claim 3, wherein the first gate electrode is divided in a plane.

5. The solid-state imaging element according to claim 3, wherein the second gate electrode is divided in a plane.

6. The solid-state imaging element according to claim 2, wherein the first gate electrode is divided in a plane.

7. The solid-state imaging element according to claim 2, wherein the second gate electrode is divided in a plane.

8. The solid-state imaging element according to claim 1, wherein the first gate electrode is divided in a plane.

9. The solid-state imaging element according to claim 1, wherein the voltage application unit includes a floating diffusion layer.

10. An imaging device, comprising
a solid-state imaging element that includes:
  a first photodiode including;
    a light incident surface on which light is incident; and
    a memory;
  an insulating film;
  a first gate electrode, via the insulating film, on the first photodiode, wherein
    the insulating film is between the first gate electrode and the first photodiode, and
    the memory is at a position facing the first gate electrode;
  a second photodiode on a side of the light incident surface with respect to the first; and
  a voltage application unit configured to apply, to the first gate electrode, a voltage corresponding to a number of charges accumulated by the second photodiode.

11. A solid-state imaging element, comprising:
photodiode including a memory;
an insulating film;
a gate electrode, via the insulating film, on the photodiode, wherein
  the insulating film is between the gate electrode and the photodiode, and
  the memory is at a position facing the gate electrode; and
a voltage application unit that changes configured to change a voltage to apply to the gate electrode, wherein
  the change is based on illuminance of light incident on the photodiode.

12. A method of controlling a solid-state imaging element, the method comprising
in the solid-state imaging element that includes
  a photodiode including a memory;
  an insulating film; and
  a gate electrode, via the insulating film, in the photodiode, wherein
    the insulating film is between the gate electrode and the photodiode, and the memory is at a position facing the gate electrode:
changing a voltage to apply to the gate electrode, wherein the change is based on illuminance of light incident on the solid-state imaging element.

* * * * *